July 3, 1928.
E. R. WITHERELL ET AL
HOBBY HORSE
Filed April 21, 1926
1,675,399
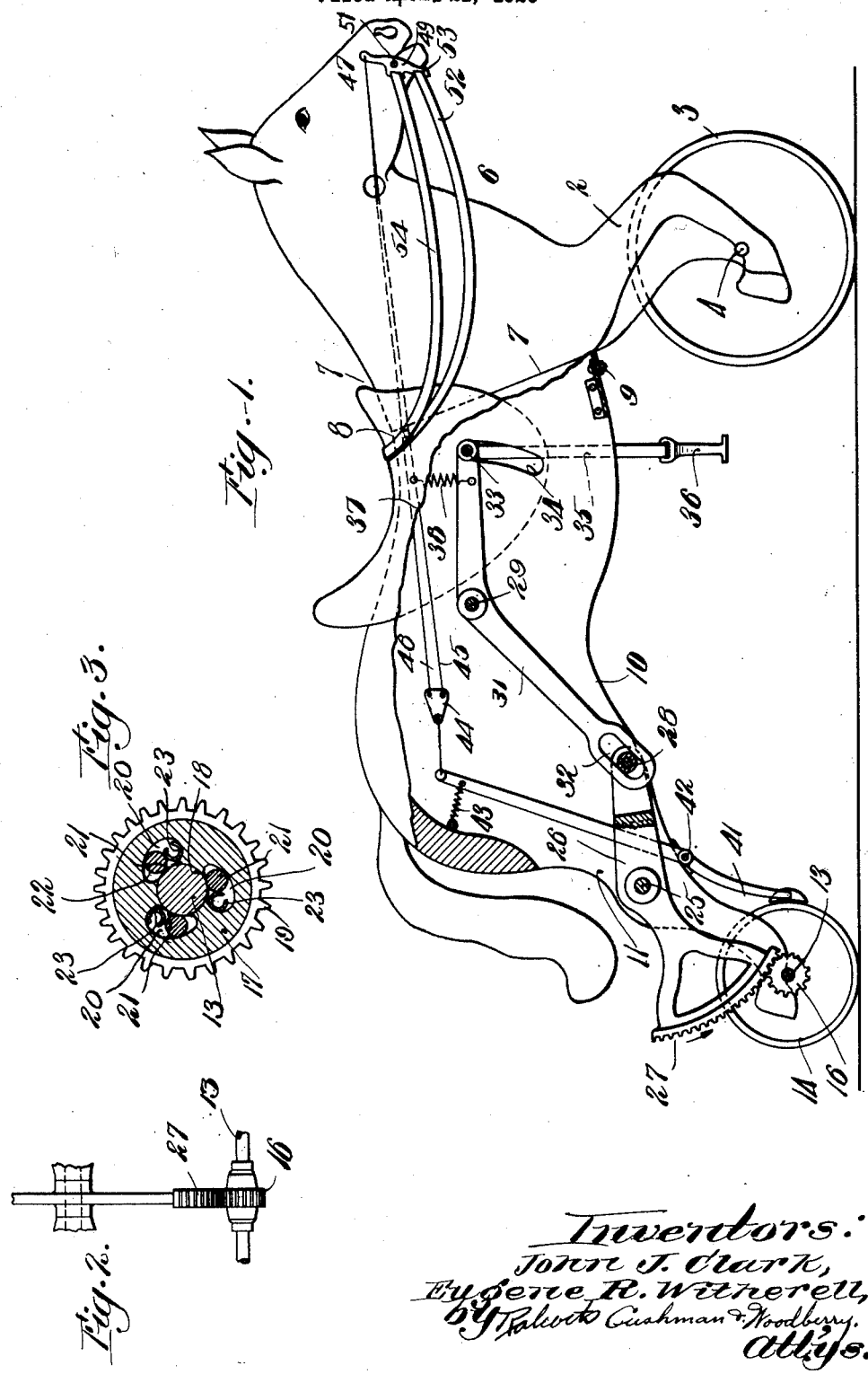

Patented July 3, 1928.

1,675,399

UNITED STATES PATENT OFFICE.

EUGENE R. WITHERELL AND JOHN J. CLARK, OF FRAMINGHAM, MASSACHUSETTS.

HOBBYHORSE.

Application filed April 21, 1926. Serial No. 103,603.

This invention relates to vehicles which are capable of being propelled and which preferably simulate a horse or other animal both in appearance and in the positions and movements assumed by the rider in the normal operation thereof.

It is well known and has long been common practice to fashion toy vehicles, especially for children, and also numerous exercising devices for adults, in the forms of various animals such as horses and the like, and also to provide a suitable mechanism by which the vehicle may be propelled along the ground. Such constructions of the prior art are characterized by containing mechanisms which, to be operated, require a rotary pedalling motion upon the part of the user, after the manner of riding a bicycle, or an alternate pedalling by each foot, which in some respects resembles walking. In all of such cases, however, the motion is entirely different from that of a horseback rider, when mounted upon a live animal, and the symmetrical movements of balancing, as well as the generally recognized stimulating and reaction benefits of the latter form of exercise, are utterly lacking.

It is therefore an object of the present invention to provide a vehicle which may be propelled by the operator or rider and which, in being so operated, requires substantially the same movements upon his part as those which are experienced by a horseback rider. Other objects will be manifest from the following disclosure.

Briefly summarized, the invention includes a form simulating that of a horse or the like which is mounted upon wheels and has a seat for the rider, stirrups or the like for his feet and mechanism for transmitting a simultaneous downward pressure or thrust of the rider's feet upon the stirrups into a continued impulse or thrust upon the rear wheels, serving to rotate them and thus to propel the vehicle forward, and means permitting the retraction of the stirrup elements. It is also provided preferably with reins or other means to be seized by the hands for steadying the rider and also for guiding the vehicle, for operating a brake, and like purposes.

A specific embodiment of the invention is shown by the accompanying drawings, in which:
Fig. 1 is a side view, with a considerable part of the body portion broken away, of a vehicle made in accordance with the invention, and simulating a horse;

Fig. 2 is a detail view of the transmission ratchet and gear employed; and

Fig. 3 is a cross section through the unidirectional transmission gear.

Referring to the drawings, numeral 1 designates the body portion generally, which is shown in the shape of a horse, the forelegs 2 thereof being supported by a wheel 3 mounted therebetween upon the axle 4.

The forward portion 6, corresponding to the head, shoulders and forelegs, is made separate from the remainder of the body but telescopes into the latter at 7 and is pivoted thereto at 8 and 9, thus rendering it capable of an independent turning movement, with respect to the position of the body as a whole, about a substantially vertical axis.

The rear portion 10 of the body 1 is supported by the hind legs 11 which are spaced apart and have mounted therebetween an axle 13 carrying a pair of wheels 14 which serve to support the vehicle in an upright and steady position. Mounted upon the central portion of the axle 13, is a unidirectional clutch 16, comprising a hub 17 having a central bore 18 therethrough, adapted to receive the axle 13, and a peripheral toothed gear 19. Parallel to the central cylindrical bore 18 are provided one or more (in the present showing three), similar bores, 20, having a substantially elliptical cross section and having openings 21 running lengthwise thereof and communicating with the central bore 18 along their elliptical sides, as shown by Fig. 3. Each of such bores 20, is provided with a substantially cylindrical roller bearing 22 of slightly less diameter than the minor axis of the ellipse and an expansion spring, such as a split cylindrical steel tube 23, or the like.

As thus associated, it will be observed that the spring member 23 tends to thrust the roller bearing into the smaller or end portion of the elliptical space and thus to force it radially inward against the axle 13. If now the gear 19 is rotated clockwise (relatively to the axle which tends to remain still, by inertia) the roller bearing is thrust or rolls into the narrower portion of the base, and, by friction against and grip upon the axle 13, effectuated by such relative movement, compels the axle to rotate therewith. This rotates the wheels 14, thus propelling the vehicle as a whole along the ground.

Upon stopping the hub 17, the continued rotation of axle 13 permits each bearing, to retract from the narrower portion of the bearing casing and to bear against and roll upon the surface of spring 23. Thus liberated, the bearing is free to rotate in the larger portion of its bore 20, upon the surface of the axle which continues to turn freely in a clockwise direction.

Secured to the legs 11 and transversely of the body portion 1, a horizontal axis 25 is provided, carrying a rocker arm 26, one end of which is provided with a circular rack 27, adapted to engage the gear 19, and the other end provided with a roller pin 28.

In the body portion 10, a second transverse axis 29 is provided, having a second rocker arm 31 pivotally mounted thereon, the rear arm of which has a slot 32 adapted to receive the roller pin 28 and the upper or forward arm (which may, if desired, be bifurcated for the purpose) having a crosspiece 33 pivoted or suspended therefrom. The ends of the crosspiece 33 extend through openings 34 in the body portion 10 and receive the stirrup straps 35 and stirrups 36, under the stirrup leather of the saddle 37. The forward end of the rocker arm 31 is normally retained in raised position by a spring 38 attached to the inside body portion 10.

Brakes 41 bearing against the rims of wheels 14 are pivoted at 42 to the leg members 11, the upper end being attached to a spring 43 (fixed to the body portion 10) and also to one corner of a triangular equalizer 44. The other two corners of the equalizer are attached to wires 45 and 46 respectively leading to the bit 49. The bit 49 is pivoted at 51 and the reins 52 are fixed to the curb portion of the bit at 53. Guide reins 54 may also be provided, attached to the bit at the pivot 51.

As thus constructed and assembled, the device is operated by the rider, seated in the saddle 37 by placing both feet in the stirrups and thrusting downwardly lightly, as when posting upon a horse at the trot—or thrusting downward and slightly forward with his whole weight as when on a horse at the gallop or canter. In this motion the rider may rise appreciably from the saddle (when the spring 38 is made stiff) or, if the spring 38 is readily flexible, he may rise only slightly. In either case, there will be a considerable reaction from the fact that the rocker arm 31, in tilting forward tends to raise the rear arm, and with it the forward end of rocker arm 26 due to its slotted engagement therewith, and thus to swing the arcuate gear 27 forward in the direction of the arrow. This movement rotates the hub 16 through the gear teeth 19, whereupon the rollers 23 grip the axle 13 as already explained, and thus connect hub 16 with axle 13. Further rotation of the hub now rotates the axle 13, together with the rear wheels 14, in a clockwise direction, driving the vehicle forward.

When the rider resumes his seat by throwing his weight backward into the saddle, and releases the stirrups, the spring 38 raises the stirrups, and the rider's feet, at the same time depressing the rear end of the rocker arm 31 and thus raising the gear 27 to its original position (as shown) in readiness for the next stroke. In so doing, the gear 19 is reversely rotated, which is permitted by the ball bearings, in this direction of rotation, being returned to the larger portion of their elliptical chambers and being thus free to revolve loosely, during this return movement. The mechanism is then ready for the next thrust, the movement synchronizing with the stroke or thrust of the rider, whether it be long or short, and imparting a uni-directional and substantially continual propulsion to the vehicle. The positions and movements of the rider coincide with and are compensated by the successive impulses of the vehicle after the manner of those experienced in good horseback riding.

A slight draft on the reins 54, if evenly distributed, will have no effect, but a slight differential pressure on either rein swings the head and front wheel in the corresponding direction, thus effectually steering the vehicle as desired. When the reins 52 are connected as for a curb bit, a firm tightening upon them draws the under or curb portion of the cheek-pieces back, thrusting the upper ends forward and thus drawing on the wires 45, 46 and through the equalizer 44 upon the upper end of the brake levers, forcing the lower ends thereof firmly against the wheels 14 and effectively braking the vehicle against either forward or backward movement.

In this manner, it is evident that the rider obtains all of the beneficial exercise and enjoyment of horseback riding, of balance, poise, and position, without conceding any of these factors to the mechanical limitations and restrictions of the vehicle, or to unusual and unnatural movements ordinarily required for propulsion.

We claim:

1. A vehicle having the general form of a horse adapted to carry a rider comprising a driving wheel having an axle, means operable by the pressure of the foot of the rider for engaging said axle to propel the vehicle, and means for disengaging the last named means to permit free movement when the foot of the rider is released.

2. A vehicle having the general form of a horse adapted for carrying a rider comprising a driving wheel having an axle, a hub mounted on said axle and means operable by the simultaneous pressure of both feet of the rider downwardly to provide uni-directional engagement between said axle and hub causing the said vehicle to be propelled.

3. A vehicle having the general form of a horse adapted to carry a rider, comprising a driving wheel having an axle, a hub mounted on said axle, means providing uni-directional engagement of said hub and axle with relative rotational movement thereof, and means operable by the simultaneous pressure of both feet of the rider to provide rotation of said hub causing uni-directional engagement of the axle therewith to propel said vehicle in a forward direction.

4. A vehicle adapted to carry a rider, comprising a driving wheel having an axle, a hub rotatably mounted upon the axle, a uni-directional clutch connecting the hub and axle operable upon relative movement therebetween in one direction and releasing upon relative movement in the opposite direction, and lever means transmitting reciprocating rotary movement to the hub by the simultaneous pressure of both feet of the rider and release thereof.

5. A vehicle adapted to carry a rider, comprising a body portion mounted upon wheels, a pair of stirrups suspended for reciprocating movement downward and back, and gear means transmitting the downward thrust of the stirrups to rotate said wheels and propel the vehicle, and means for returning said stirrups to raised position upon release of pressure thereon.

6. A vehicle having the general form of a horse, comprising forward and rear body portions pivotally connected, a single wheel supporting the forward portion and serving to steer the vehicle, a pair of driving wheels supporting the rear portion, an axle connecting the driving wheels, a hub and gear associated with the axle of the driving wheel, uni-directional clutch connecting said gear and axle during forward movement and releasing during rearward movement, a pivoted segment gear meshing with the hub gear, and means including a pair of stirrups operative to drive said gears by the simultaneous downward thrust of the rider's weight upon the stirrups.

7. A vehicle having the general form of a horse, comprising forward and rear body portions pivotally connected, a single wheel supporting the forward portion and serving to steer the vehicle, a pair of driving wheels supporting the rear portion, an axle connecting the driving wheels, a hub and gear associated with the axle of the driving wheel, a uni-directional clutch connecting said gear and axle during forward movement and releasing during rearward movement, a pivoted segment gear meshing with the hub gear, and means including a pair of stirrups and levers operative to drive said gears by the simultaneous downward thrust of the rider's weight upon the stirrups.

8. A vehicle having the general form of a horse, comprising a pivoted forward portion for steering, a body portion, a pair of driving wheels fixed to a transverse axis on the body portion, a hub rotatably mounted on the axis, a uni-directional clutch mechanism on said hub for gripping said axis, gear teeth on the hub, a rocker arm carrying a segment gear meshing with said gear teeth, a second rocker arm pivotally connected to the first rocker arm at one end, a horizontal crosspiece at the other end of the second rocker arm projecting transversely through the body portion and freely disposed for up and down movement, and stirrups depending from the projecting ends of said crosspiece.

9. A vehicle having the general form of a horse, comprising a pivoted forward portion for steering, a body portion, a pair of driving wheels fixed to a transverse axis on the body portion, a hub rotatably mounted on the axis, a uni-directional clutch mechanism on said hub for gripping said axis, gear teeth on the hub, a rocker arm carrying a segment gear meshing with said gear teeth, a second rocker arm pivotally connected to the first rocker arm at one end, a horizontal crosspiece at the other end of the second rocker arm and projecting transversely through the body portion, and free for up and down movement, a pair of stirrups depending from said crosspiece, and means for retracting the stirrups, upon release into raised position.

10. A vehicle having the general form of a horse, comprising a forward steering portion, a body portion, a pair or stirrups thereunder, a horizontal crosspiece supporting said stirrups and freely suspended for simultaneous movement up and down and lever means for transmitting said downward movement only to the driving wheels and spring means for raising the same during upward movement.

Signed by us at Boston, Massachusetts, this sixteenth day of April, 1926.

EUGENE R. WITHERELL.
JOHN J. CLARK.